(12) United States Patent
Park

(10) Patent No.: US 8,884,858 B2
(45) Date of Patent: Nov. 11, 2014

(54) LIQUID CRYSTAL DISPLAY DEVICE

(75) Inventor: Chi Hyuck Park, Daegu-Si (KR)

(73) Assignee: LG Display Co., Ltd., Seoul (KR)

( * ) Notice: Subject to any disclaimer, the term of this patent is extended or adjusted under 35 U.S.C. 154(b) by 1791 days.

(21) Appl. No.: 11/476,818

(22) Filed: Aug. 25, 2006

(65) Prior Publication Data

US 2007/0146271 A1  Jun. 28, 2007

(30) Foreign Application Priority Data

Dec. 23, 2005 (KR) .......................... 10-2005-0128531

(51) Int. Cl.
*G09G 3/36* (2006.01)
*G02F 1/1335* (2006.01)

(52) U.S. Cl.
CPC ........ *G02F 1/1335* (2013.01); *G02F 1/133504* (2013.01)
USPC .................. 345/89; 345/55; 345/90; 345/204

(58) Field of Classification Search
USPC ........................................ 345/89–90, 55, 204
See application file for complete search history.

(56) References Cited

U.S. PATENT DOCUMENTS

| | | | | |
|---|---|---|---|---|
| 5,767,935 A | * | 6/1998 | Ueda et al. ..................... | 349/112 |
| 2005/0024565 A1 | * | 2/2005 | Hwang et al. .................. | 349/119 |
| 2008/0043489 A1 | * | 2/2008 | Etori .............................. | 362/618 |

FOREIGN PATENT DOCUMENTS

| | | |
|---|---|---|
| CN | 1261444 A | 7/2000 |
| CN | 1407382 A | 4/2003 |
| CN | 1453596 A | 11/2003 |
| CN | 1499221 A | 5/2004 |
| EP | 0 996 025 A1 | 4/2000 |
| JP | 07-104271 | 4/1995 |
| JP | 7-104271 A | 4/1995 |
| JP | 8-234183 A | 9/1996 |
| JP | 09-281475 | 10/1997 |
| JP | 2000-171619 | 6/2000 |
| JP | 2003-202415 | 7/2003 |
| JP | 2004-061543 A | 2/2004 |
| JP | 2005-31658 A | 2/2005 |
| KR | 09-281475 | 10/1997 |
| KR | 10-0434925 | 5/2004 |

* cited by examiner

*Primary Examiner* — William Boddie
*Assistant Examiner* — Leonid Shapiro
(74) *Attorney, Agent, or Firm* — Morgan, Lewis & Bockius LLP

(57) ABSTRACT

A liquid crystal display device includes a liquid crystal panel, a first polarizer and a second polarizer respectively disposed at the upper side and at the lower side of the liquid crystal panel, and a light path control film disposed at an outer side of the first polarizer to redirect light transmitted through the liquid crystal panel at low angles of the viewing angle to minimize gray inversion at the low angles of the viewing angle.

15 Claims, 19 Drawing Sheets

<off-state>

<on-state>

Gray-inversion display normal display

<on-state>

θ1, θ2, θ3 ....

θ1, θ2, θ3 ....

θ1, θ2, θ3 ....  θ1', θ2', θ3' ....

θ1, θ2, θ3 ....  θ1', θ2', θ3' ....

θ1, θ2, θ3 ....

θ1, θ2, θ3 ....

θ1, θ2, θ3 ....    θ1', θ2', θ3' ....

θ1, θ2, θ3 ....    θ1', θ2', θ3' ....

<on-state>

LIQUID CRYSTAL DISPLAY DEVICE

This application claims the benefit of Korean Patent Application No. P2005-128531, filed on Dec. 23, 2005, which is hereby incorporated by reference as if fully set forth herein.

BACKGROUND OF THE INVENTION

1. Field of the Invention

The present invention relates to a display device, and more particularly, to a liquid crystal display device. Although the present invention is suitable for a wide scope of applications, it is particularly suitable for minimizing deterioration of an image by gray inversion.

2. Discussion of the Related Art

As the information society develops, demand for flat panel display devices is gradually increasing. To satisfy this demand, various types of flat panel display devices, such as a liquid crystal display device (LCD), a plasma display panel (PDP), an electro-luminescent display (ELD), a vacuum fluorescent display (VFD), and the like are being researched and produced for use as a display device in a variety of apparatuses. The LCD is the portable display device most widely used as a substitute for cathode ray tube (CRT) due to the LCD having the features of high image quality, lightweight, thin profile, and low power consumption. The LCD is been used in various fields, such as TVs, desktop computer monitors and laptop computer monitors. Lightweight, thin profile, and low power consumption as well as high definition, high brightness, large screen size and a high quality image are features that will enable the LCD to be used as a general display device in numerous applications.

The LCD displays an image by controlling electric field across liquid crystal molecules in liquid crystal cells to modulate light transmission through the liquid crystal cell. LCDs can either be a vertical electric field type liquid crystal display device or a horizontal electric field type liquid crystal display device depending on the direction of applied electric field for driving the liquid crystal. In the vertical electric field type liquid crystal display device, a common electrode on the upper substrate and a pixel electrode on the lower substrate face each other in vertical direction such that electric field is created in a vertical direction across the liquid crystal by an electric voltage applied to the electrodes. The vertical electric field type liquid crystal display device has a wide aperture ratio but has a narrow viewing angle. A typical liquid crystal mode of the vertical electric field applied type liquid crystal display device is a twisted nematic (hereinafter referred to "TN") mode.

FIGS. 1A and 1B are cross-sectional views respectively illustrating orientation of liquid crystal molecules in an OFF-state and an ON-state of a TN mode LCD. In the liquid crystal panel 10 of the TN mode LCD, as shown in FIGS. 1A and 1B, a liquid crystal layer 5 of liquid crystal molecules is positioned between an upper substrate 7 and a lower substrate 3. For illustrative convenience, FIGS. 1A and 1B illustrate liquid crystal molecules seen from a three O'clock direction. An upper polarizer 9 having a light transmission axis of a specific direction is attached on a light emission surface of the upper substrate 7 and a lower polarizer 11 having a light transmission axis perpendicular to the light transmission axis of the upper polarizer 9 is attached on a light incident surface of the lower substrate 3. Under the assumption of a normally white mode in which WHITE is in 'OFF'-state and BLACK is in 'ON'-state, operation of a TN mode will be described in reference to FIGS. 1A and 1B.

In the OFF-state, as shown in FIG. 1A, when electric voltage is not applied to the upper substrate 7 and the lower substrate 3, local optical axes (directors) are continuously twisted between the upper substrate 7 and the lower substrate 3 by 90 degrees. In this OFF-state, the polarization characteristics of linear polarized incident light transmitted through the lower polarizer 11 is changed and is transmitted through the upper polarizer 9.

In the ON-state, as shown in FIG. 11B, when electric voltage is applied to a common electrode on an upper transparent substrate and a pixel electrode on a lower transparent substrate such that an electric field is applied across the liquid crystal molecules due to the voltage difference between the common electrode and the pixel electrode, an axis of an intermediate portion of the liquid crystal layer 5 is no longer aligned to transmit light. In this ON-state, the linearly polarized incident light transmitted through the lower polarizer 11 is transmitted through the liquid crystal layer 5 and the polarization characteristics thereof are maintained so that the linearly polarized incident light is not transmitted through the upper polarizer 9.

FIG. 2 is experimental data illustrating changes of brightness according to the angle viewed of the viewing angle, and FIGS. 3A and 3B are photographs respectively illustrating a gray inversion image and a normal image. The above-described TN mode has a high permeability and is easy to produce, but gray inversion occurs in lower angles of the viewing angle. The gray inversion, as shown in the experimental data in FIG. 2, illustrates a phenomenon in which a low gray level is brighter than a high gray level in the lower angles of the viewing angle. As seen in FIG. 3A, the image quality at the lower angles of the viewing angle have a gray inversion that significantly deteriorates the image as compared to a direct view, as shown in FIG. 3B. The reasons for the gray inversion occurring in the TN mode will be explained in reference to FIGS. 4A and 4B.

FIGS. 4A and 4B are views respectively illustrating changes in light transmission of the liquid crystal in the OFF-state and the ON-state of a liquid crystal according to the angles viewed of the viewing angle. A big reason for the gray inversion is because the reflection index is changed according to the angle of viewing. Birefringence $d\Delta n$ of the liquid crystal layer is thickness d of the liquid crystal layer times the reflective index $\Delta n$. As shown in FIG. 4A, in the OFF-state of the TN mode liquid crystal panel 10, there is almost no difference between a first birefringence $d\Delta n1$ in a first direction (the lower angle of viewing) that a user sees an image from the lower side of the liquid crystal panel 10, a second birefringence $d\Delta n2$ in a second direction (the upper angle of viewing) that the user sees the image from the upper side of the liquid crystal panel 10, and a third birefringence $d\Delta n3$ in a third direction that the user sees the image from directly in front of the liquid crystal panel 10.

In contrast, as shown in FIG. 4B, since an average director A of the liquid crystal is slightly inclined from the vertical direction in the ON-state of the TN mode, the effective birefringence $d\Delta n$ of a light transmitted through the liquid crystal is slightly different according to an angle of viewing. More precisely, the relationship of $d\Delta n1 < d\Delta n3 < d\Delta n2$ is established. In other words, since the user sees a short axis and a long axis in the first direction of the liquid crystal when changing to the third direction and to the second direction, the gray level to be actually implemented is approximately implemented in the first direction but the gray level is at a slight higher brightness in the second direction and in the third direction as the value of $d\Delta n$ increases (P1 area in FIG. 2). Thus, when the user looks at the image in a fourth direction having an angle of viewing lower than that of the first direction, the gray level in the fourth direction gray is brighter than the gray level as seen in the first direction (P2 area in FIG. 2) since d$\Delta$n4 in the fourth direction is greater than d$\Delta$n1 in the first direction.

FIG. 5 illustrates gray inversion regions where the gray inversion is generated according to the angles of viewing. As shown in FIG. 5, on the basis of a point where the average direction $\Delta$n of the liquid crystal is theoretically "0" (zero), the birefringence of the low gray level is greater than the birefringence of the high gray level at the lower angle of viewing from the lower part of the panel (at the lower side of the liquid crystal panel), and thus a gray inversion appears in the image. This gray inversion deteriorates the image quality in the TN mode and restricts the use of the display by the user.

SUMMARY OF THE INVENTION

Accordingly, the present invention is directed to a liquid crystal display device that substantially obviates one or more of the problems due to limitations and disadvantages of the related art.

An object of the present invention is to provide a liquid crystal display device in which deterioration of image quality due to a gray inversion is minimized.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes a liquid crystal panel, a first polarizer and a second polarizer respectively disposed at the upper side and at the lower side of the liquid crystal panel, and a light path control film disposed at an outer side of the first polarizer to redirect light transmitted through the liquid crystal panel at low angles of viewing to minimize gray inversion at the low angles of viewing.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in FIGS. 6A to 18C. Wherever possible, the same reference numbers will be used throughout the drawings to refer to the same or like parts, and additional description for the same will be omitted.

Figure 1A:
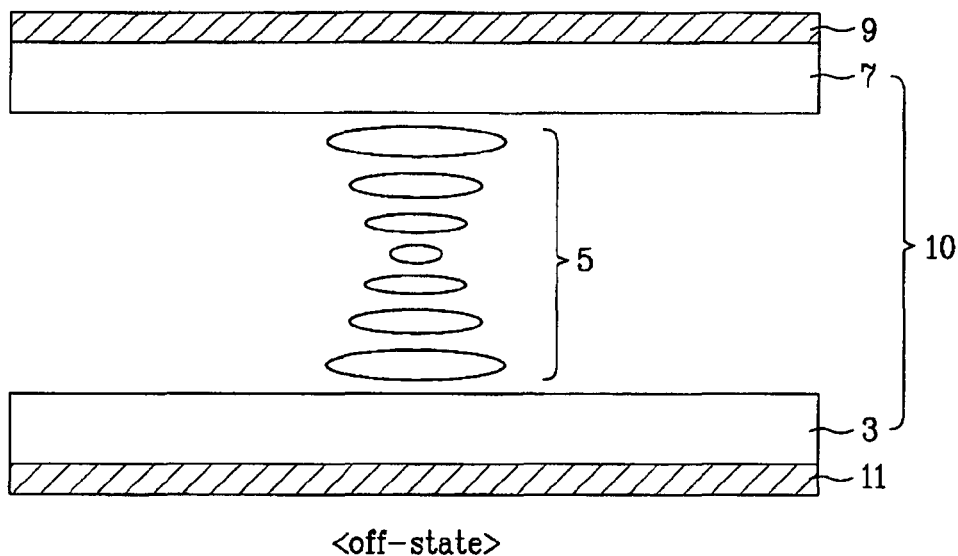
FIGS. 1A and 1B are cross-sectional views respectively illustrating orientation of liquid crystal molecules in an OFF-state and an ON-state of a TN mode LCD.
Figure 1B:
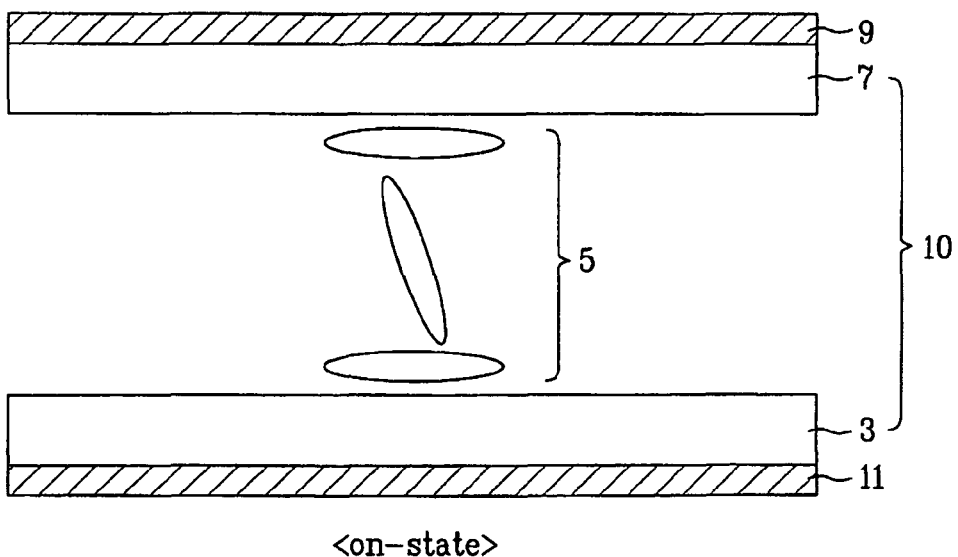
Figure 2:
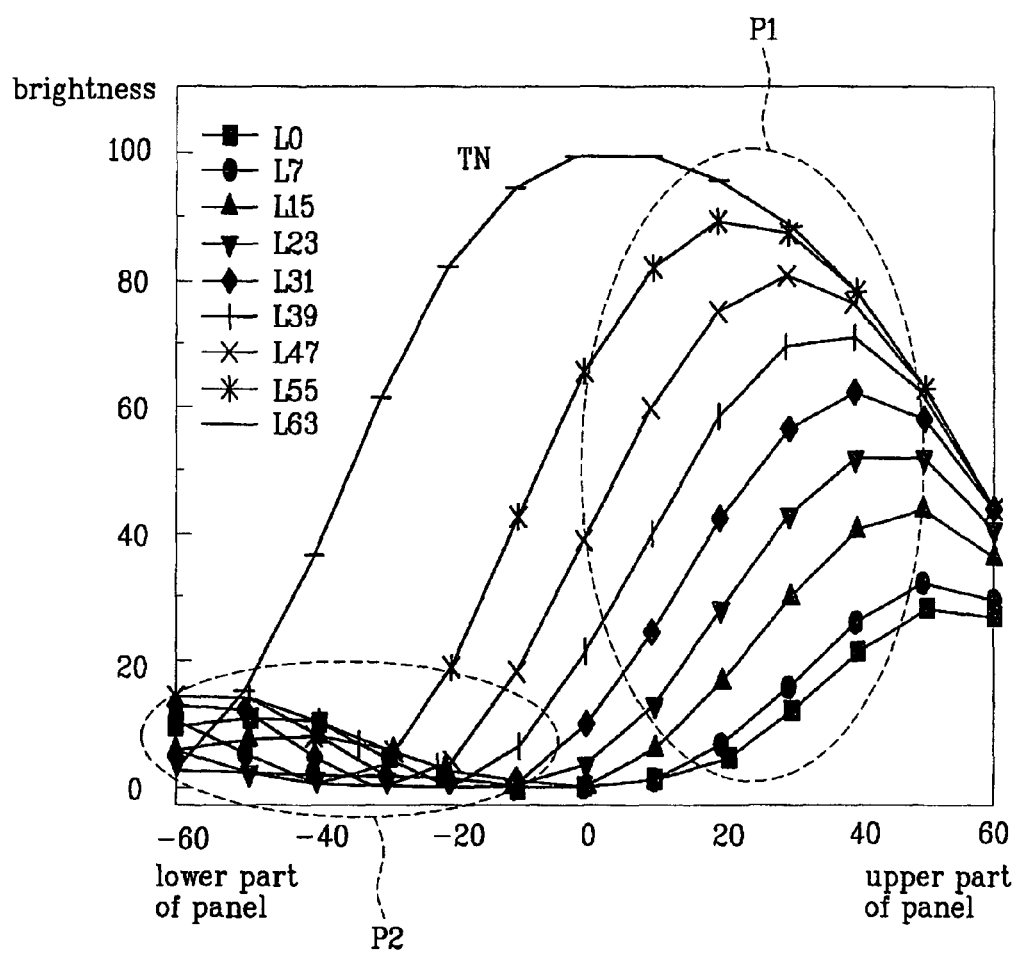
FIG. 2 is experimental data illustrating changes of brightness according to the angle viewed of the viewing angle.
Figure 3A:
FIGS. 3A and 3B are photographs respectively illustrating a gray inversion image and a normal image.
Figure 3B:
Figure 4A:
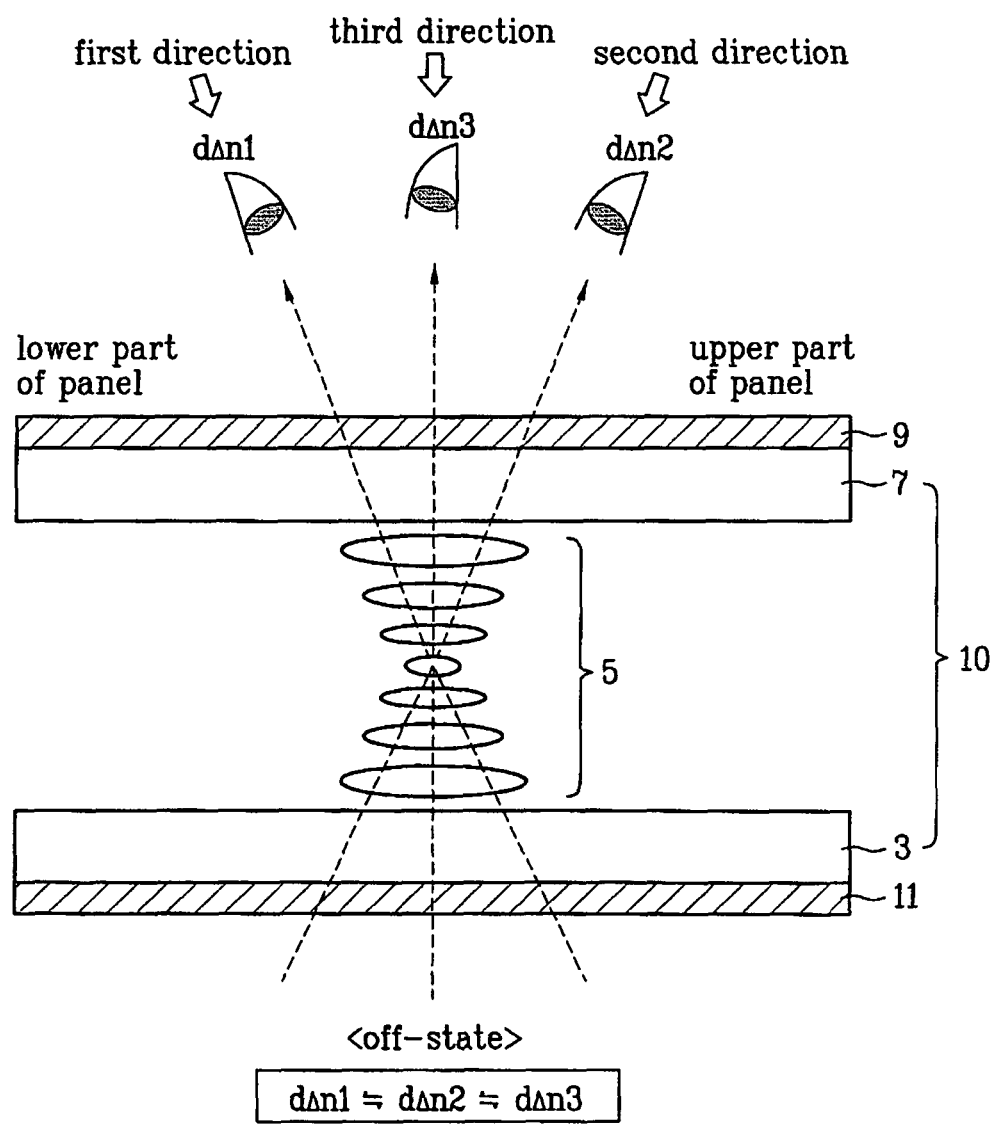
FIGS. 4A and 4B are views respectively illustrating changes in light transmission of the liquid crystal in the OFF-state and the ON-state of a liquid crystal according to the angles viewed of the viewing angle.
Figure 4B:
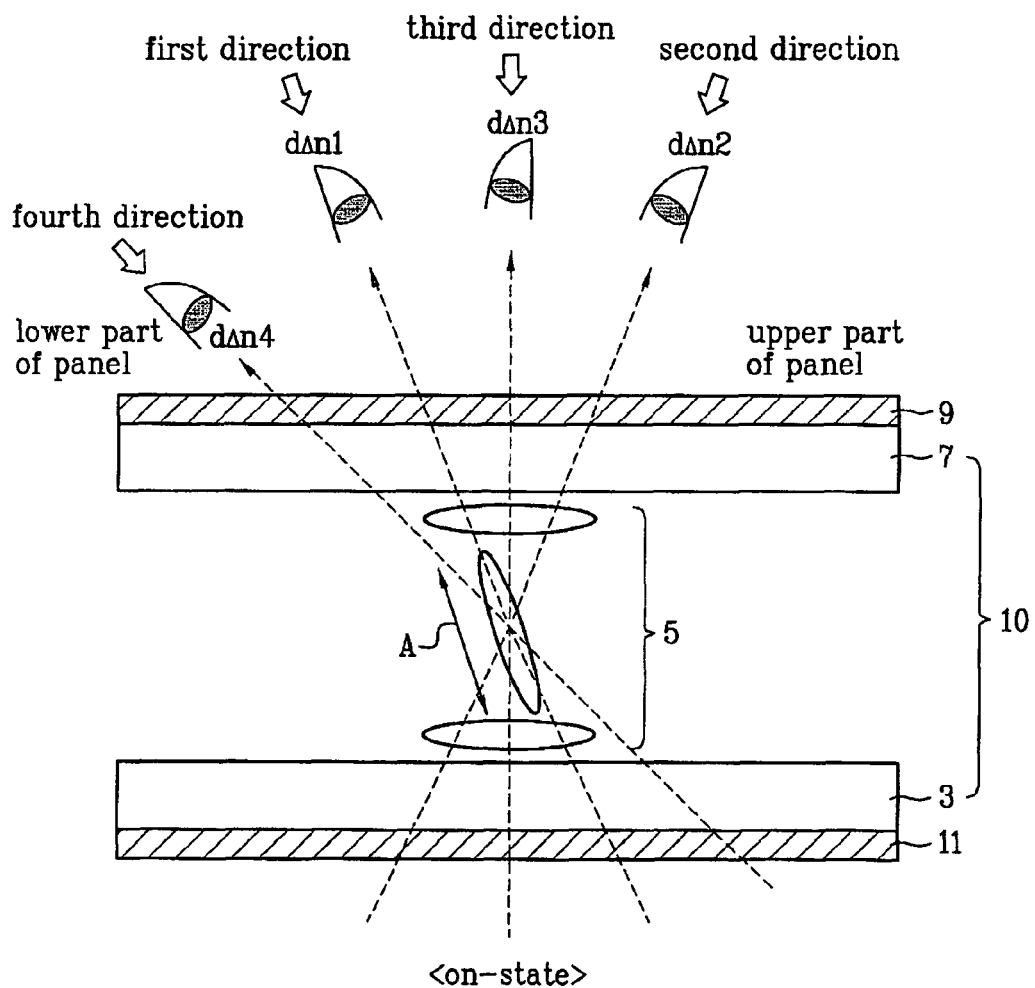
Figure 5:
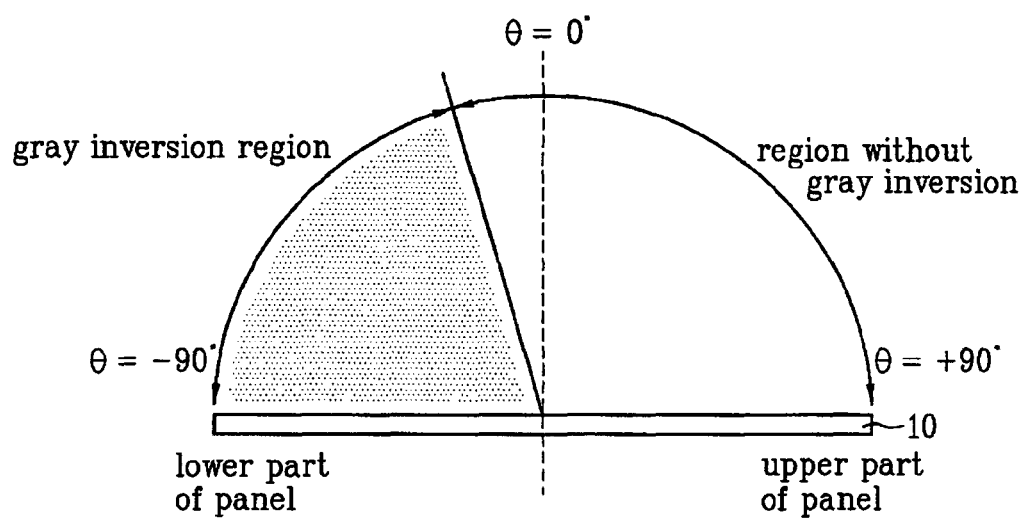
FIG. 5 illustrates gray inversion regions where the gray inversion is generated according to the angles viewed of the viewing angle.
Figure 6A:
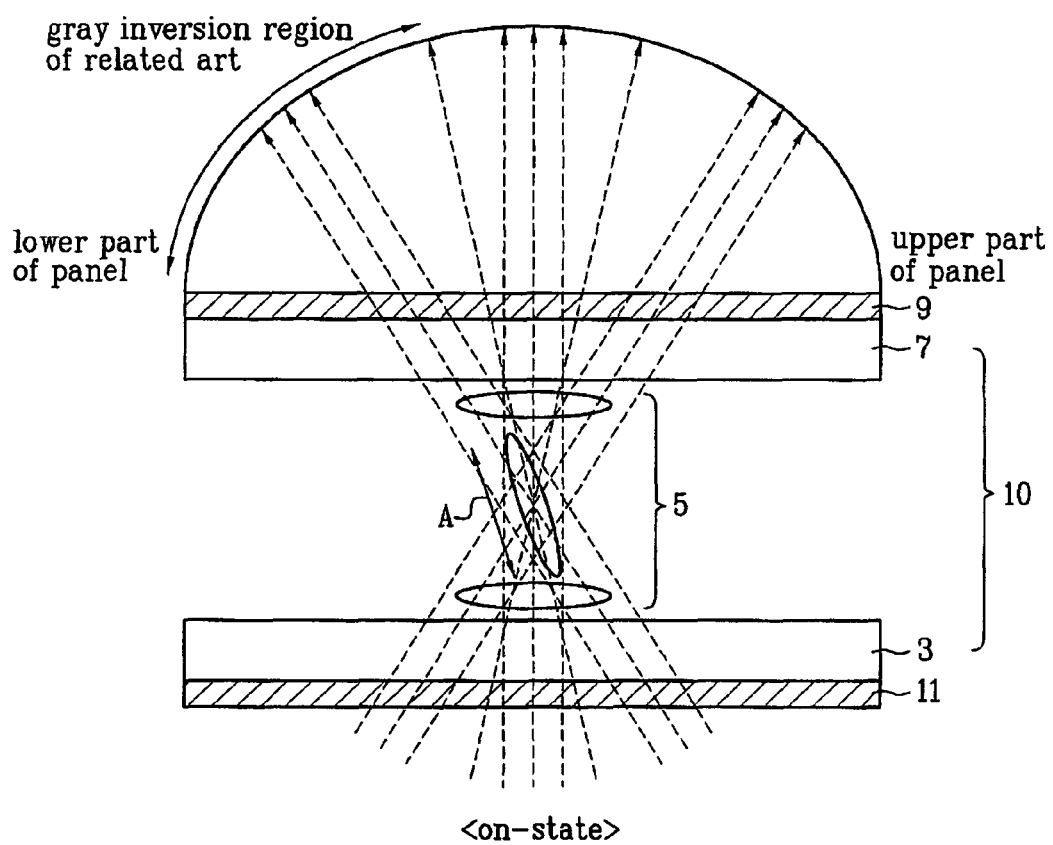
FIGS. 6A and 6B are views respectively illustrating the gray inversion regions of liquid crystal panels in the ON-state of a liquid crystal display device in related art and a liquid crystal display device according to a first set of embodiments of the present invention.
Figure 6B:
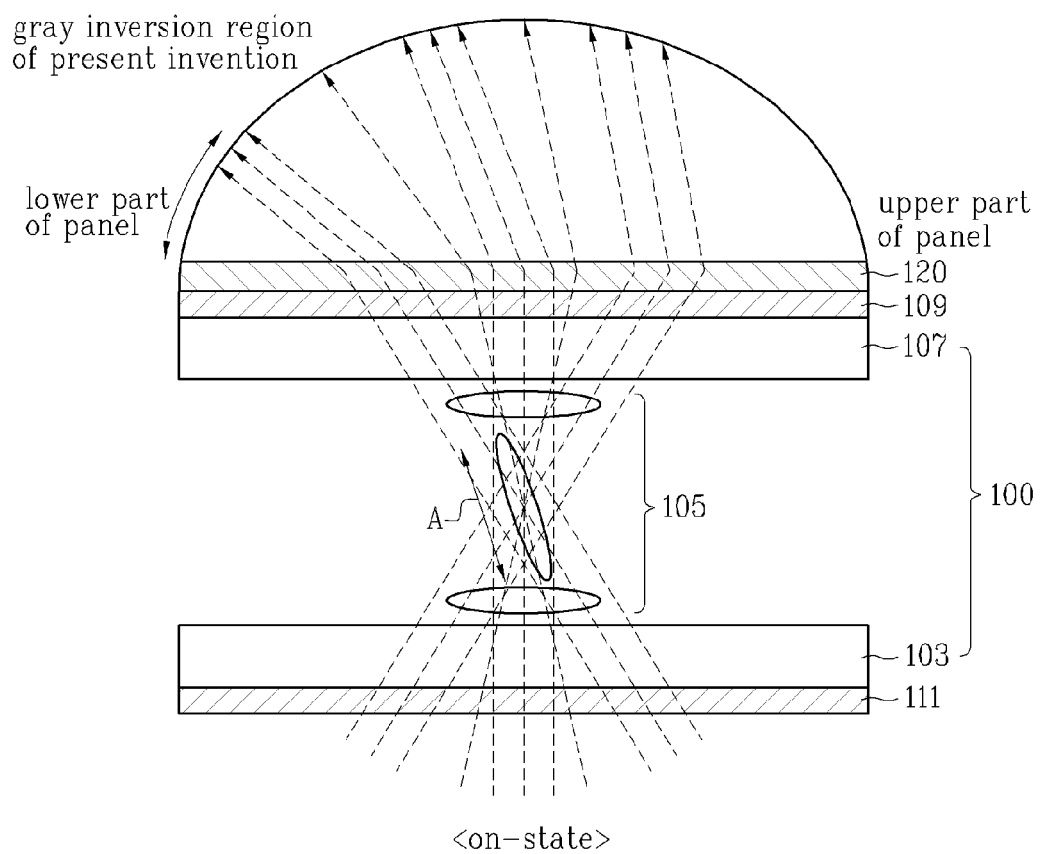

FIGS. 6A and 6B are views respectively illustrating the gray inversion regions of liquid crystal panels in the ON-state of a related art liquid crystal display device and a liquid crystal display device according to a first set of embodiments of the present invention. The liquid crystal panel 10, as shown in FIG. 6A, includes a lower substrate 3 facing an upper substrate 7, a liquid crystal layer 5 formed between the upper and lower substrates 7 and 3, and an upper polarizer 9 and a lower polarizer 11 respectively formed at the rear sides of the lower substrate 3 and the upper substrate 7. In the related art liquid crystal panel 10, as shown in FIG. 6A, the gray inversion occurs at angles of the viewing angle lower than an average director A of the liquid crystal layer 5 at a lower side of the liquid crystal panel 10.

To minimize a gray inversion area, the liquid crystal display device according to the first set of embodiments of the present invention, as shown in FIG. 6B, refracts a part of a light being transmitted through a liquid crystal panel 100 to the lower side of the liquid crystal panel 100. More specifically, the liquid crystal display device according to the first set of embodiments of the present invention includes a first substrate 103 and a second substrate 107 facing each other, a liquid crystal layer 105 filled between the first and second substrates 103 and 107, a first polarizer 109 and a second polarizer 111 respectively formed at the rear sides of the first substrate 103 and the second substrate 107, and a light path control film 120 for controlling a light path of a light transmitted through the first polarizer 109.

By using the light control film 120, light being transmitted along short axes off of the average director A of the liquid crystal layer 105 is refracted from a light emission surface of the liquid crystal panel 100 to the lower side so that a user sees a light being transmitted along shorter axes off of the average director A at very low angles of the viewing angle on the lower side of the liquid crystal panel 100. As a result, as shown in FIG. 6B, the gray inversion area that the user actually perceives is significantly reduced. In other words, the gray inversion area can be minimized by redirecting the transmitted light to even lower angles of the viewing angle and decreasing the transmitted light in the upper angles of the viewing angle.

Figure 7:
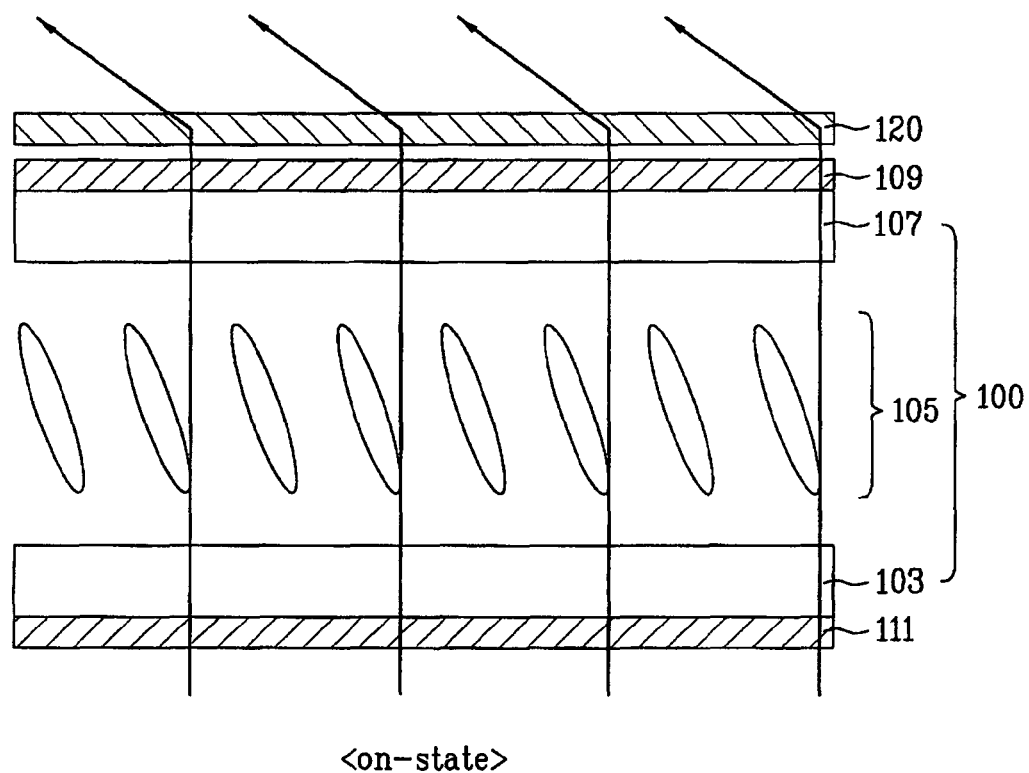
FIG. 7 is a cross-sectional view illustrating the liquid crystal display device according to the first set of embodiments of the present invention.
Figure 8:
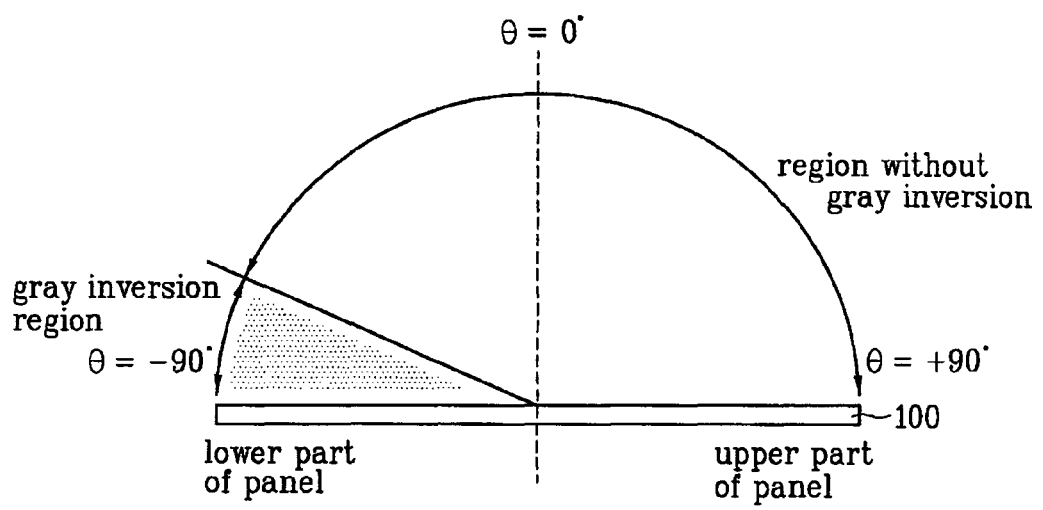
FIG. 8 illustrates the gray inversion region reduced by a light path control film in the liquid crystal display device of FIG. 7.

FIG. 7 is a cross-sectional view illustrating the liquid crystal display device according to the first set of embodiments of the present invention, and FIG. 8 illustrates the gray inversion region reduced by a light path control film in the liquid crystal display device of FIG. 7. As shown in FIG. 7, the liquid crystal display device according to the first set of embodiments of the present invention includes a liquid crystal panel 100 having a first substrate 103 and a second substrate 107 in which a thin film transistor array (not shown) and a color filter array (not shown) are respectively formed and a liquid crystal layer 105 formed between the first and second substrates 103 and 107, a first polarizer 109 attached to a light emission surface (a rear side) of the second substrate 107 and having a specific directional light transmission axis, and a second polarizer 111 attached to a light incident surface (a rear side) of the first substrate 103 and having a light transmission axis perpendicular to the light transmission axis of the first polarizer 109. The first polarizer 109 is called an analyzer and the second polarizer 111 is called a polarizer. The liquid crystal layer 105 contains liquid crystal molecules having a positive dielectric anisotropy used in the TN mode.

The thin film transistor array formed in the first substrate 103 includes a plurality of gate lines (not shown) and a plurality of data lines (not shown) crossing each other to define a pixel area, a pixel electrode (not shown) formed in the pixel area, and a thin film transistor formed in the crossed area of the gate lines and the data lines. The color filter array formed in the second substrate 107 includes a black matrix layer (not shown) formed to correspond to an area except for the pixel area, a color filter layer (not shown) formed to correspond to at least the pixel area, and a common electrode formed in the front side of the second substrate 107. The pixel electrode of the first substrate 103 and the common electrode of the second substrate 107, their respective vertical electric fields are generated when electric voltage is applied thereto.

A light path control film (or optical layer) 120 is formed at the outer side of the first polarizer 109 to control a light transmitted through the liquid crystal panel 100. This light path control film 120 refracts the light by a predetermined angle. FIG. 6B illustrates the light path control film 120 controlling the light to only be seen in the lower angles of the viewing angle on the lower side of the liquid crystal panel 100.

In the liquid crystal display device according to the first set of embodiments of the present invention, an electric voltage is applied to the common electrode and the pixel electrode of the liquid crystal panel 100 such that an optical axis of an intermediate portion of the liquid crystal layer 105 is parallel to the electric field in the ON-state when the electric field is applied to the liquid crystal. The average director A of the liquid crystal is slightly inclined about the vertical direction. Since the polarization characteristics of the light transmitted the liquid crystal layer 105 is no longer consistent with the polarization direction of the first polarizer 109 because of the change in the optical axis of the intermediate liquid crystal, black is implemented (in the case of normally white).

In the ON-state, leakage light that is transmitted through the first polarizer 109 is refracted to the lower side of the liquid crystal panel 100 by the light path control film 120. Since leakage light can still be transmitted along shorter axes off of the average director A of the liquid crystal panel 100, leakage light is refracted from the light emission surface of the liquid crystal panel 100 to a lower angle of the viewing angle on the liquid crystal panel 100 such that a user may still see leakage light transmitting along the short axes off of the average director A. However, as shown in FIG. 8, the gray inversion area that the user effectively sees is remarkably reduced.

Figure 9A:
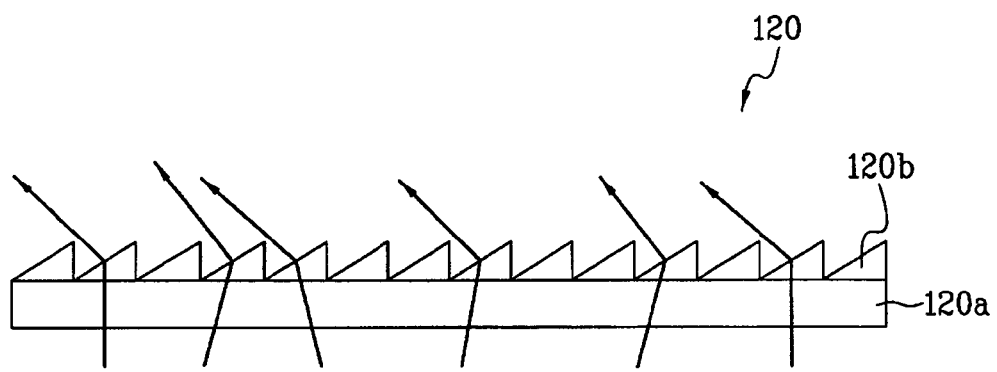
FIGS. 9A and 9B are cross-sectional views illustrating detailed structures of the light path control film in FIG. 7.
Figure 9B:
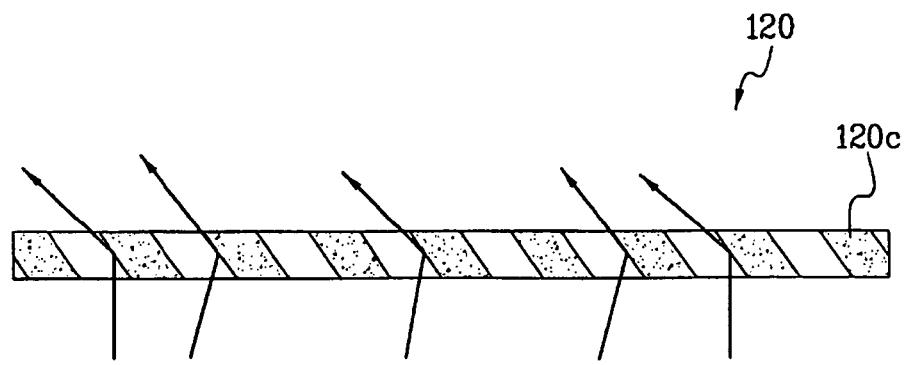

FIGS. 9A and 9B are views illustrating detailed structures of the light path control film in FIG. 7. The light path control film 120, as shown in FIG. 9a, includes a transparent plastic substrate 120a and a triangle-shaped prism 120b sloped in the refractive direction. The prism 120b is disposed on the substrate 120a and can also made of a transparent plastic.

The substrate 120a and the prism 120b can be made of polymethylmethacrylate (PMMA), vinyl chloride, acryl-based resin, polycarbonate (PC), polyethylene terephthalate (PET), polyethylene (PE), polystyrene (PS), polypropylene (PP), polyimide-based resin (PI), glass, and silica. Generally, a refractive index of the PMMA is about 1.49, a refractive index of the PC is about 1.53, a refractive index of the PS is about 1.58, a refractive index of the PP is about 1.49, a refractive index of the PET is about 1.57, and a refractive index of the PS is about 1.59. By combining the above-described materials having such refractive indexes or the above-described materials with a refractive index of air (1.0), the light path control film 120 can be made. Moreover, since the refractive indexes of the above-described materials are dependant on the shapes and number of double bonds of resin monomer, a benzene ring, and the like, the shapes and number are adjusted so that the refractive indexes of resins can be minutely adjusted. Additionally, by doping triple bonds of the resin monomer, the benzene ring, and strong polar group, the refractive indexes of the resins can be adjusted.

The prism 120b is generally made by using refraction and reflection according to Snell's law due to the difference of a refractive index of air and the refractive indexes of the resins. Thus, the light path can be controlled as much as required by the pattern and an angle of the slope of the prism 120b, as shown in FIG. 9A. The light path control film 120 may be made by preparing a single substrate and partially etching the upper side of the substrate into a triangle-shaped prism, or a right angled triangle-shaped prism without a substrate.

FIG. 9B is a view illustrating another structure for the light path control film 120. The light path control film 120 may be made by stacking a plurality of two more materials having different refractive indexes and cutting the stack along the oblique line 120c. Thus, the oblique line 120c in FIG. 9B indicates a boundary between the materials and the refractive indexes are changed at the boundary so that the light path can be controlled.

In the liquid crystal display device according to the first set of embodiments of the present invention, a method of reducing the gray inversion to very low angles of the viewing angle at the lower side of the liquid crystal panel 100 has been described. Hereinafter, will be described a liquid crystal display device in which a light emitted at lower angles of the viewing angle is reduced by redirecting the leakage light to upper angles of the viewing angle to minimize the appearance of gray inversion.

Figure 10:
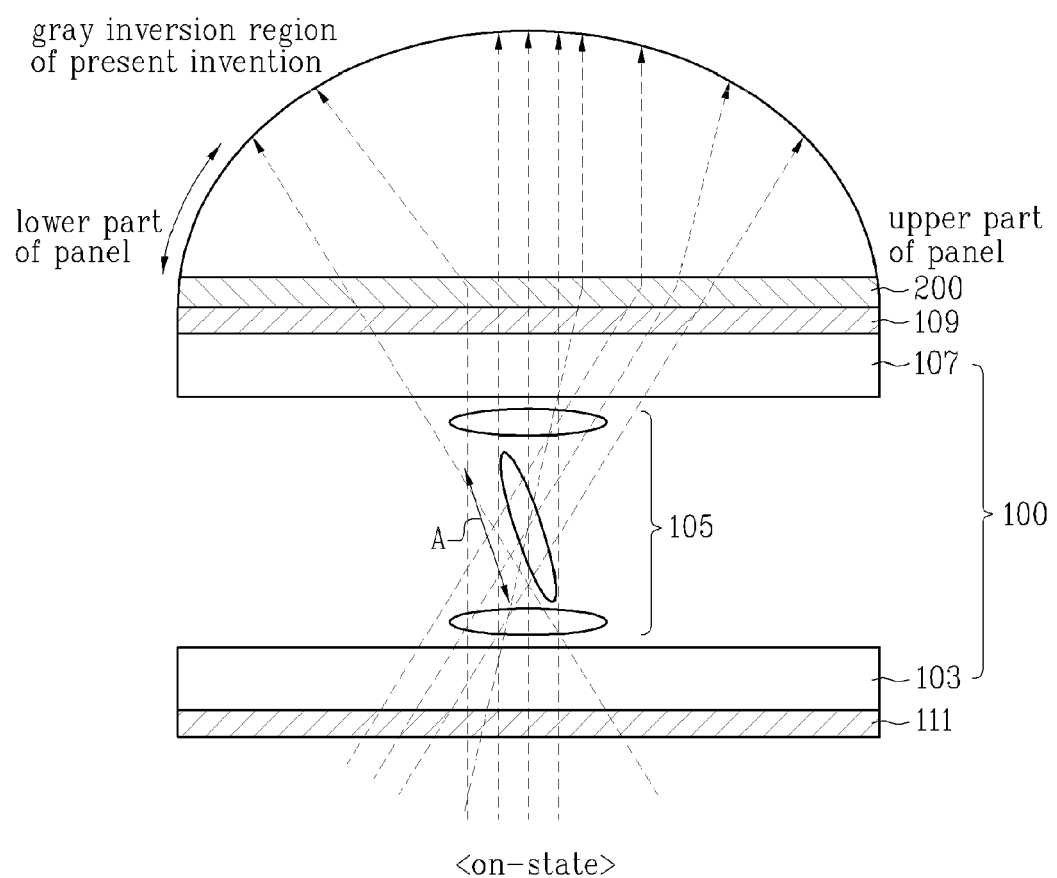
FIG. 10 is a cross-sectional view illustrating a liquid crystal display device according to a second set of embodiments of the present invention.

FIG. 10 illustrates a liquid crystal display device according to a second set of embodiments of the present invention. The liquid crystal display device according to the second set of embodiments of the present invention has a similar structure as that of the liquid crystal display device according to the first set of embodiments of the present invention as shown in FIG. 7, except for a light path control film 200 has light path control characteristics that are different in different regions of the light path control film 200. In other words, the liquid crystal display device according to the second set of embodiments of the present invention includes a liquid crystal panel 100 having a first substrate 103 and a second substrate 107 in which a thin film transistor array (not shown) and a color filter array (not shown) are respectively formed and a liquid crystal layer 105 formed between the first and second substrates 103 and 107, a first polarizer 109 attached to a light emission surface (rear side) of the second substrate 107 and having a specific directional light transmission axis, and a second polarizer 111 attached to a light incident surface (a rear side) of the first substrate 103 and having a light transmission axis perpendicular to the light transmission axis of the first polarizer 109. Here, the first polarizer 109 is called an analyzer and the second polarizer 111 is called a polarizer. The light path control film 200 is disposed on the upper side of the first polarizer 109. The liquid crystal layer 105 is filled with liquid crystal molecules having a positive dielectric anisotropy used in the TN mode.

The thin film transistor array formed in the first substrate 103 includes a plurality of gate lines (not shown) and a plurality of data lines (not shown) crossing each other to define a pixel area, a pixel electrode (not shown) formed in the pixel area, and a thin film transistor formed in the crossed area of the gate lines and the data lines. The color filter array formed in the second substrate 107 includes a black matrix layer (not shown) formed to correspond to an area except for the pixel area, a color filter layer (not shown) formed to correspond to at least the pixel area, and a common electrode formed in the front side of the second substrate 107. Although not depicted in the drawings, the liquid crystal display device further includes a backlight unit (not shown) for transmitting a light to the liquid crystal panel 100 disposed on the lower side of the liquid crystal panel 100.

The liquid crystal display device according to the second set of embodiments of the present invention, as shown in FIG. 10, has a structure for compensating for image deterioration due to light being excessively emitted at lower angles of the viewing angle at the lower side of the liquid crystal panel 100. As shown in FIG. 10, the liquid crystal display device according to the second set of embodiments of the present invention, minute shapes in patterns are formed on the surface of a light path control film 200 that are different depending on their position so as to redirect light to the upper angles at the front side of the liquid crystal panel 100. The redirected light is distributed so that the luminous characteristics at the front side of the liquid crystal panel 100 in the upper angles of the viewing angle can be improved. Moreover, light emitted at the upper angles of the viewing angle is mixed with light redirected from the lower angles of the viewing angle in the TN mode so that both upper and lower angles of the viewing angle can be implemented without gray inversion. Hereinafter, the light path control film 200 will be described in detail with reference to the drawings.

Figure 11:
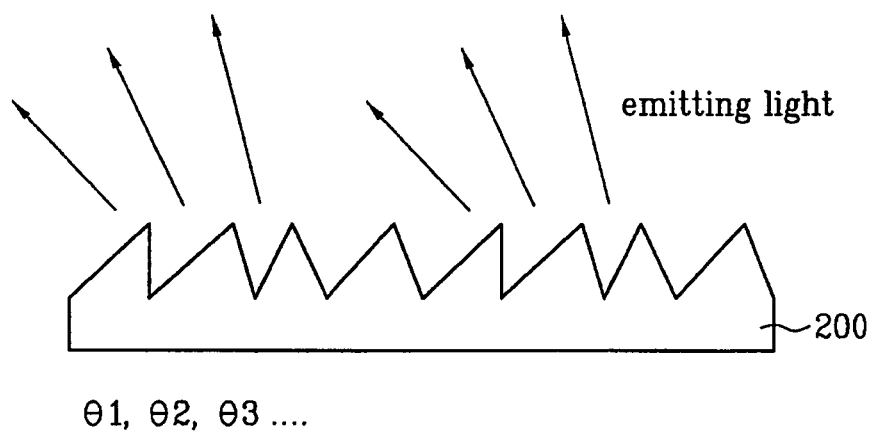
FIGS. 11 to 14 are cross-sectional views illustrating various modifications of a light path control film employed in the liquid crystal display device according to the second set of embodiments of the present invention.

FIGS. 11 to 14 are cross-sectional views illustrating various modifications of a light path control film employed in the liquid crystal display device according to the second set of embodiments of the present invention. As shown in FIG. 11, the light path control film 200 includes a plurality of triangular slopes for redirecting light transmitted through the liquid crystal panel 100 to different emission angles $\theta1, \theta2, \theta3 \ldots$. The light path control film 200 is made of transparent plastic. The slopes of the light path control film 200 are provided at surfaces through which the light is emitted so that the light can be redirected from the surfaces into two or more directions different from each other according to the inclination of the plurality of slopes. The light path control film 200 is made by patterning surfaces of a transparent substrate or by stacking the minute patterns on the transparent substrate and the light emission surfaces in the form of the slopes. Thus, some light can be emitted at lower angles of the viewing angle while another portion of the light from the lower angles of the viewing angle is redirected toward the upper angles of the viewing angle. As shown in FIG. 11, light at upper angles of the viewing angle is redirected toward the upper angles of the viewing angle.

Figure 12:
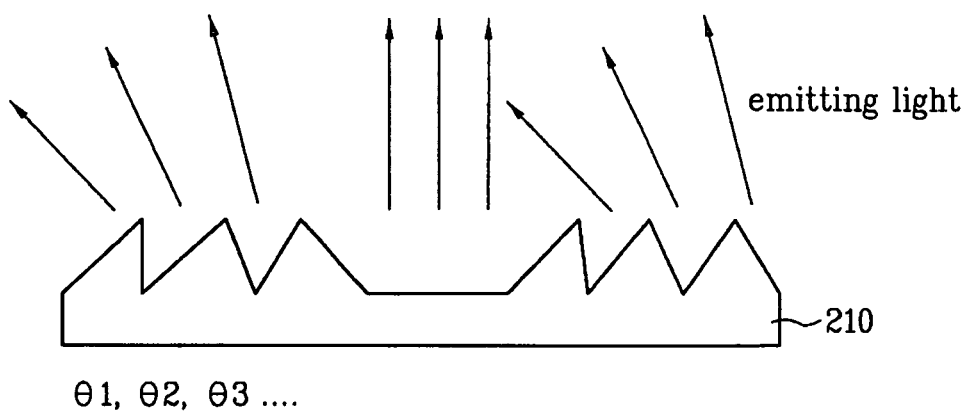

A light path control film 210, as shown in FIG. 12, includes minute patterns having a first set of different shaped slopes for redirecting light at lower angles of the viewing angle toward the upper angles of the viewing angle, a second set of different shaped slopes for redirecting light at upper angles of the viewing angle toward the upper angles and a portion without the slopes for emitting a greater quantity of light toward the front direction. Due to the portion of the pattern without the slope together with the portion redirecting light from the lower angles of the viewing angle to the upper angles of the viewing angle, the quantity of the light emitted from the liquid crystal panel 100 is relatively greater than the quantity of the light emitted at the lower angles of the viewing angle. Here, a side of the light path control film 210 facing the liquid crystal panel 100 is formed in a flat surface opposite to the side where the slopes form the light emission angles $\theta1, \theta2, \theta3, \ldots$. As shown in FIG. 12, light at upper angles of the viewing angle is redirected toward the upper angles of the viewing angle.

Figure 13:
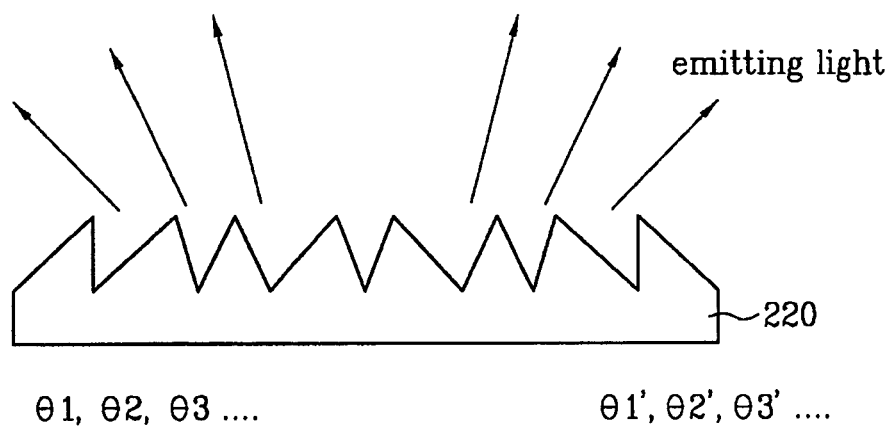

The light path control film 220 in FIG. 13 includes minute patterns having different shaped slopes for redirecting the light from a front direction to lower angles of the viewing angle and to upper angles of the viewing angle simultaneously. The light path control film 220 redirects light with a plurality of light emission angles $\theta1, \theta2, \theta3 \ldots$ toward the upper angles of the viewing angle and with a plurality of light emission angles $\theta1', \theta2', \theta3' \ldots$ toward the lower angles of the viewing angle.

Figure 14:
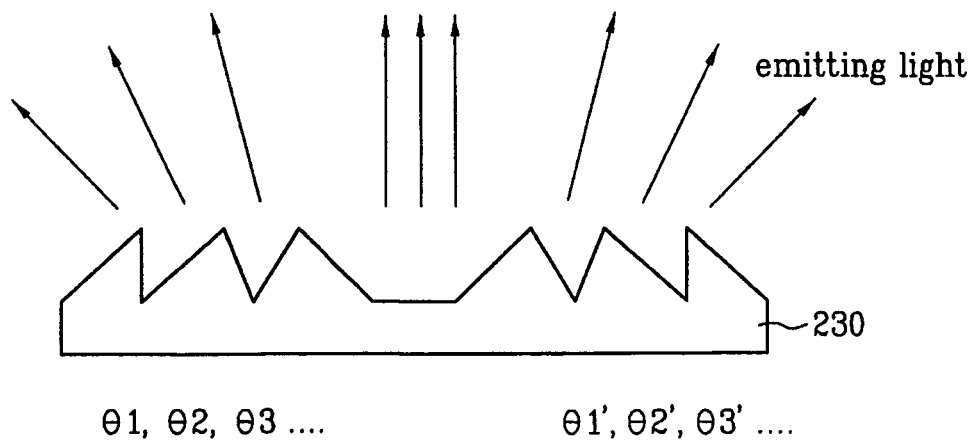

The light path control film 230 in FIG. 14, includes minute patterns having different shaped slopes for redirecting light in at least one direction from the front direction to the lower angles of the viewing angle, and in at least one direction from the front direction to the upper angles of the viewing angle simultaneously, and a portion without the patterns for emitting a greater quantity of the light in the front direction. The light path control film 230 redirects light from the upper angles of the viewing angle with a plurality of light emission angles $\theta1, \theta2, \theta3 \ldots$ toward the upper angles of the viewing angle and light from the lower angles of the viewing angle with a plurality of light emission angles θ1', θ2', θ3' . . . toward the lower angles of the viewing angle. The light path control film 230 emits a quantity of light in the front direction that is greater than a quantity of the light emitted in the lower angles of the viewing angle or the upper angles of the viewing angle.

The light path control films 200 to 230 as described with reference to FIGS. 11 to 14 are respectively made of transparent substrates similar to those described with reference to FIGS. 9a to 9b, and control the characteristics of the light emitted from the liquid crystal panel 100 according to the refractive indexes of the materials. Meanwhile, in the light path control films in FIGS. 11 to 14, the slopes for refracting the emitted light transmitted through the liquid crystal panel 100 are formed in the transmission side. Hereinafter, a light path control film including the slopes formed in the side facing the liquid crystal panel 100 will be described. The latter has advantage of adjusting the direction of the emission angle, but the former is more useful in manufacturing process when taking the point of attaching the light path control film on the upper side of the first polarizer 109 into consideration.

Figure 15A:
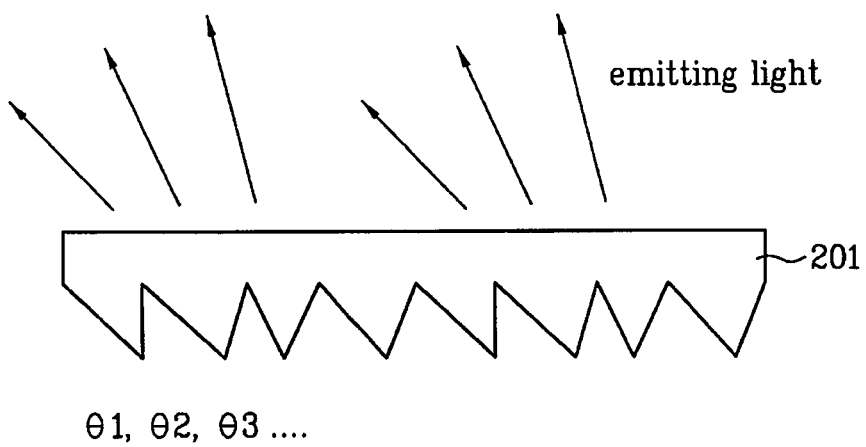
FIGS. 15A to 15D are cross-sectional views illustrating other modifications of the light path control film employed in the liquid crystal display device according to the second set of embodiments of the present invention.

FIGS. 15A to 15D are cross-sectional views illustrating other modifications of the light path control film employed in the liquid crystal display device according to the second set of embodiments of the present invention. As shown in FIG. 15A, a light path control film 201 disposed at the upper side of the first polarizer 109 disposed at the upper side of the liquid crystal panel 100 includes a plurality of triangular slopes for redirecting lights transmitted through the liquid crystal panel 100 at different light angles θ1, θ2, θ3 . . . . The light path control film 201 is made of a transparent plastic. In this case, the slopes of the light path control film 201 are disposed on the surface corresponding to the first polarizer 109 so that the light transmitted through the liquid crystal panel 100 can be emitted from a surface through which the light is emitted out of the light path control film 201 along the plural slopes in two or more directions. The light path control film 201 may be made by patterning a surface of a transparent substrate or such that a flat transparent substrate and a surface corresponding to the liquid crystal panel 100 are stacked with the minute patterns patterned with the above-described slopes. Thus, some light can be emitted at lower angles of the viewing angle while another portion of the light from the lower angles of the viewing angle is redirected toward the upper angles of the viewing angle. As shown in FIG. 15A, light at upper angles of the viewing angle is redirected toward the upper angles of the viewing angle.

Figure 15B:
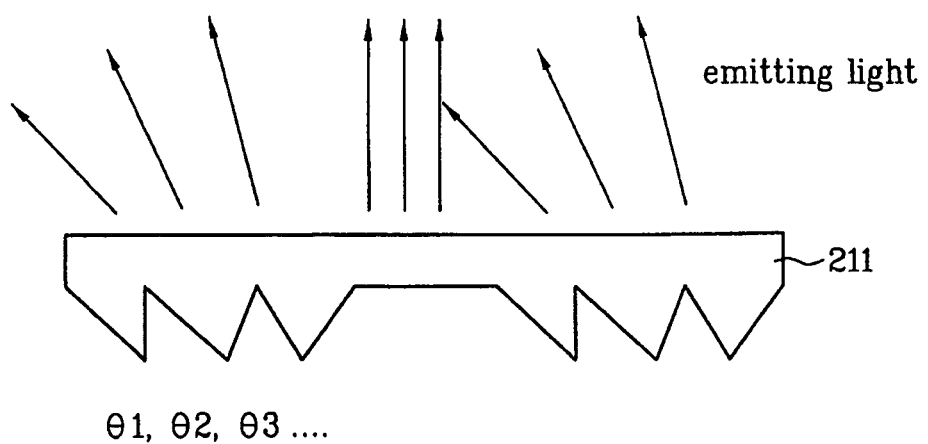

A light path control film 211 depicted in FIG. 15B includes minute patterns having a first set of different shaped slopes for redirecting light at lower angles of the viewing angle toward the upper angles of the viewing angle, a second set of different shaped slopes for redirecting light at upper angles of the viewing angle toward the upper angles and a portion without the slopes for emitting a greater quantity of light toward the front direction. Due to the portion of the pattern without the slope together with the portion redirecting light from the lower angles of the viewing angle to the upper angles of the viewing angle, the quantity of the light emitted from the liquid crystal panel 100 is relatively greater than the quantity of the light emitted at the lower angles of the viewing angle. Here, a side of the light path control film 211 facing the liquid crystal panel 100 is formed in a flat surface opposite to the side where the slopes form the light emission angles θ1, θ2, θ3, . . . .

Figure 15C:
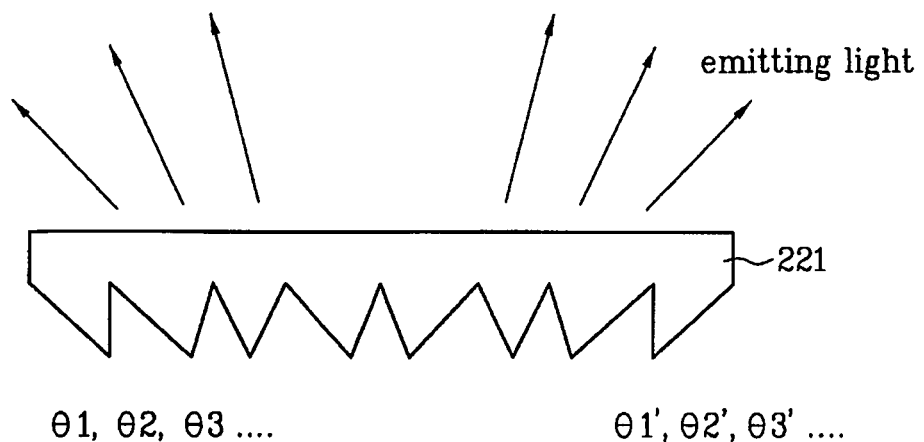

A light path control film 221 depicted in FIG. 15C includes minute patterns having different shaped slopes for redirecting the light from a front direction to lower angles of the viewing angle and to upper angles of the viewing angle simultaneously. The light path control film 221 redirects light from the upper angles of the viewing angle to the other upper angles of the viewing angle with a plurality of light emission angles θ1, θ2, θ3 . . . and the light of the lower angles of the viewing angle is redirected with a plurality of light emission angles θ1', θ2', θ3' . . . toward other lower angles of the viewing angle.

Figure 15D:
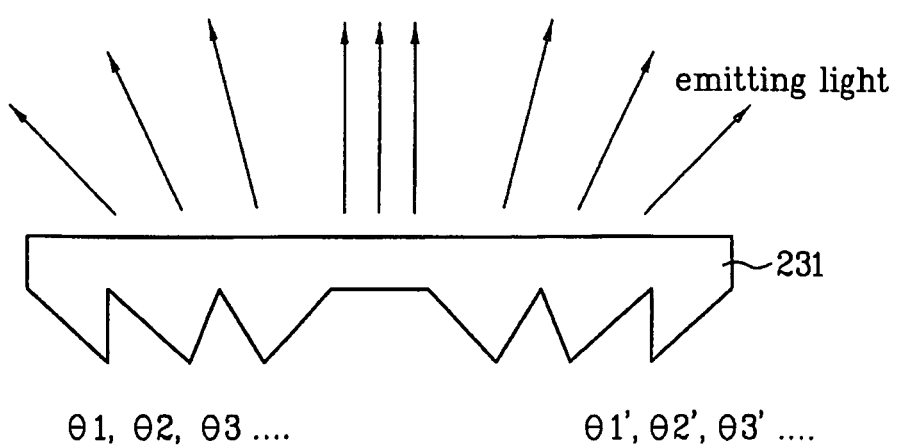

A light path control film 231 depicted in FIG. 15D includes having different shaped slopes for redirecting light in at least one direction from the front direction to the lower angles of the viewing angle, and in at least one direction from the front direction to the upper angles of the viewing angle simultaneously, and a portion without the patterns for emitting a greater quantity of the light in the front direction. The light path control film 231 includes different shaped minute patterns for forming a plurality of light emission angles θ1, θ2, θ3 . . . for directing light toward the upper angles of the viewing angle and a plurality of light emission angles θ1', θ2', θ3' . . . for directing light toward the lower angles of the viewing angle. The light path control film 231 emits a quantity of the light in the front direction that is greater than a quantity of the light emitted in the lower angles of the viewing angle or upper angles of the viewing angle.

Figure 16:
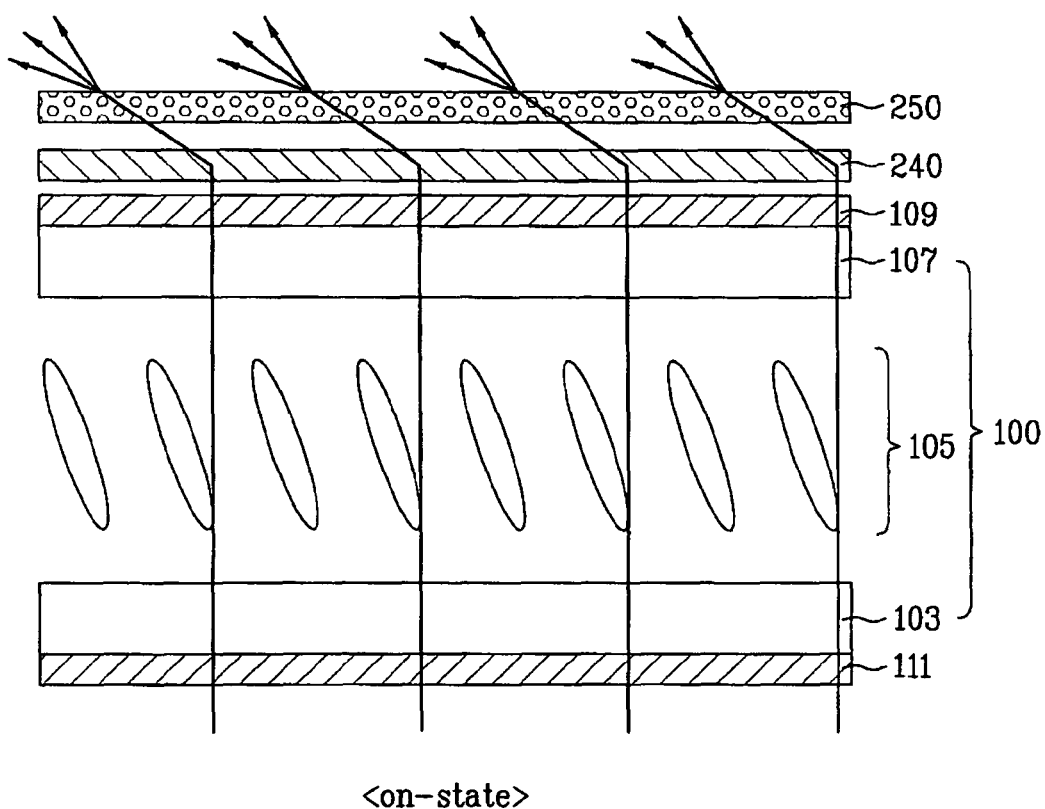
FIG. 16 is a cross-sectional view illustrating a liquid crystal display device according to a third set of embodiments of the present invention.

FIG. 16 is a cross-sectional view illustrating a liquid crystal display device according to a third set of embodiments of the present invention. As shown in FIG. 16, the liquid crystal display device according to the third set of embodiments of the present invention further includes a diffusion film 250 disposed on the light path control film 240 of the liquid crystal display device depicted in FIG. 10. In the liquid crystal display device according to the third set of embodiments of the present invention, the structure of the light path control film 240, as shown in FIGS. 11 to 14 or 15A to 15D, may further include a diffusion film. Since the same reference numbers will be used to refer to the same or like parts, the additional description for the same will be omitted.

The light path control film 240 according to the third set of embodiments of the present invention serves to emit a light in the lower angles of the viewing angle and to refract at two more angles and emit the same, and the diffusion film 250 disperses and diffuses the light refracted by the light path control film 240. The diffusion film 250 includes a bead serving as a diffusion agent and a binder for fixing the same. Due to the material of the bead, the refraction indexes depends on the material of the bead, the size of the bead, and the size distribution of the bead. Thus, optical characteristics can be controlled. The material of the bead can be an inorganic material, such as silica, or an organic material, such as polymethylmethacrylate (PMMA). To adjust the optical characteristics, the combination of the above-described materials with various refractive indexes can be used. Here, the size and the refractive index of the beads may be uniformly distributed, or distributed by mixing two or more materials with different sizes and refractive indexes. Usually, the binder is made of acryl or epoxy.

Figure 17A:
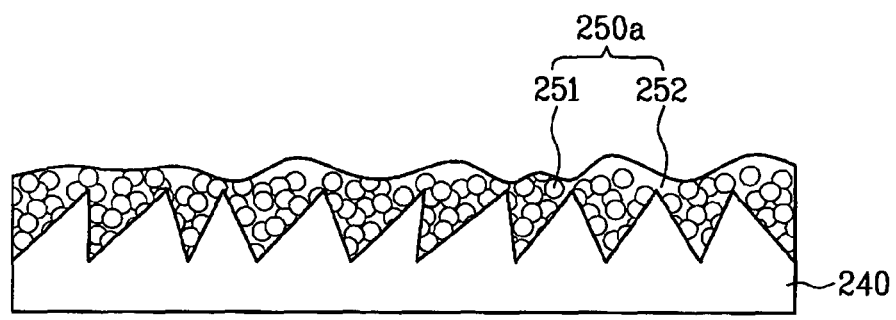
FIGS. 17A to 17C are cross-sectional views illustrating various modifications of the light path control film and a light dispersion processing layer employed in the liquid crystal display device according to the third set of embodiments of the present invention.
Figure 17B:
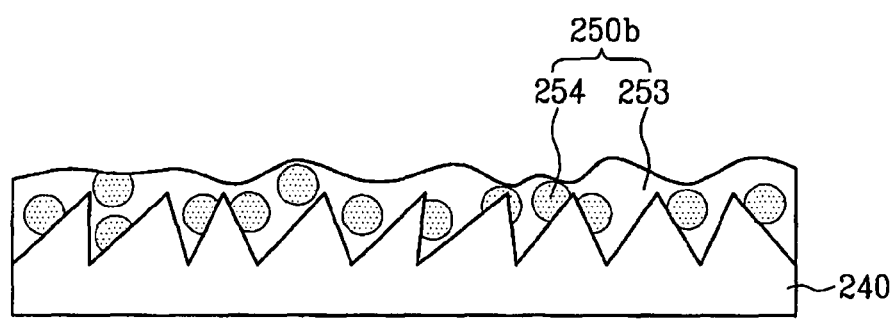
Figure 17C:
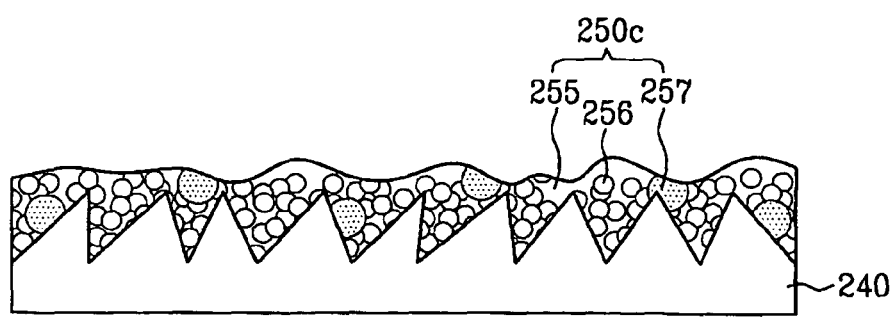

FIGS. 17A to 17C are cross-sectional views illustrating various modifications of the light path control film and a light dispersion processing layer employed in the liquid crystal display device according to the third set of embodiments of the present invention. A light dispersion processing layer 250a depicted in FIG. 17A includes a bead 251 serving as a diffusion agent and a binder 252 for fixing the bead 251. The bonding of the bead 251 to the binder 252 can be accomplished by being coated on the upper side of a certain transparent substrate (not shown) or by being coated on the upper surface of the light path control film 240. In the latter, the light path control film 240, the bead 251, and the binder 252 are integrally formed. Here, the light path control film 240 is used by selecting one of the light path control films depicted in FIGS. 11 to 14. The material of the diffusion film 250a, such as the bead 251, may have a refractive index identical to or different from that of the material of the light path control film 240, and the diffusion film 250a is made of a material of a refractive index for effective light diffusion.

A diffusion film 250b depicted in FIG. 17B includes a bead 254 having a size relatively larger than that of the bead 251 depicted in FIG. 17A and contained in a transparent substrate 253. The diffusion film 250b is formed on the upper side of the light path control film 240. The light path control film 240 can be made in the form of any one of the light path control films depicted in FIGS. 11 to 14.

A diffusion film 250c depicted in FIG. 17C includes two more beads 256 and 257 of different sizes added into the diffusion film depicted in FIG. 17A. The beads 256 and 257 are fixed by a binder 255. The diffusion film 250c is formed on the upper side of the light path control film 240, and the light path control film 240 can be made in the form of any one of the light path control films depicted in FIGS. 11 to 14.

As the beads 255 and 256 depicted in FIGS. 17A to 17C, one of PMMA, vinyl chloride, acryl-based resin, polycarbonate, polyethylene terephthalate (PET), polyethylene (PE), polystyrene (PS), polypropylene (PP), polyimide-based resin (PI), glass, and silica may be used. Hereinafter, the light path control films depicted in FIGS. 15a to 15d and the light dispersion processing layers formed in the upper sides thereof will be described.

Figure 18A:
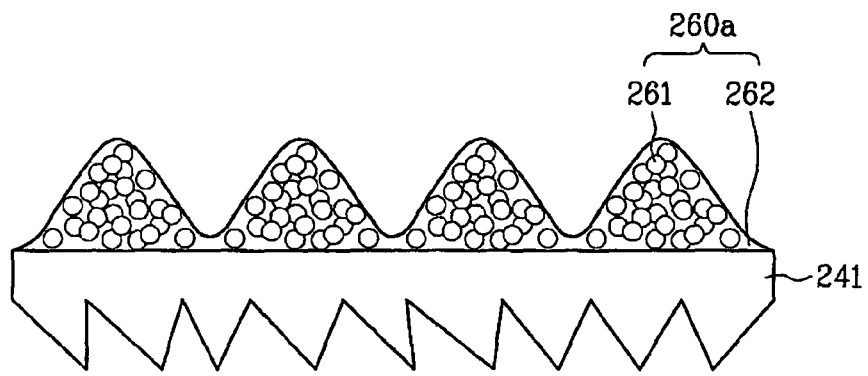
FIGS. 18a to 18c are cross-sectional views illustrating other modifications of the light path control film and the light dispersion processing layer employed in the liquid crystal display device according to the third set of embodiments of the present invention.
Figure 18B:
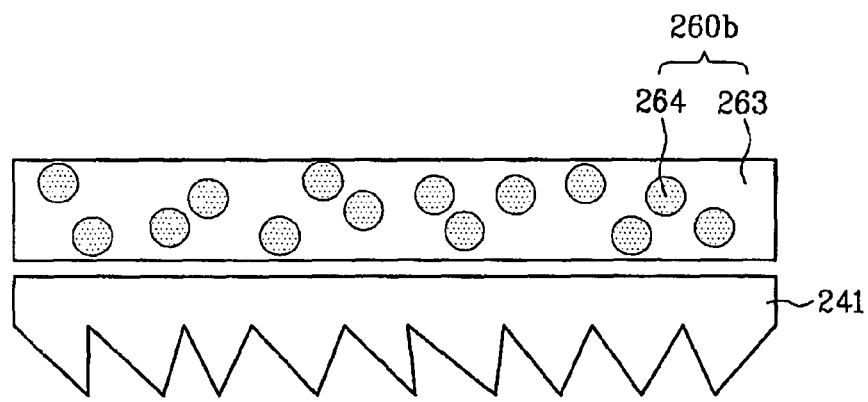
Figure 18C:
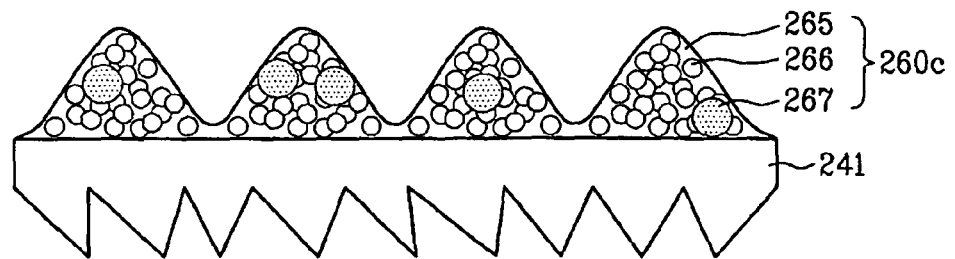

FIGS. 18A to 18C are cross-sectional views illustrating another modifications of the light path control film and the light dispersion processing layer employed in the liquid crystal display device according to the third set of embodiments of the present invention. The light dispersion processing layer 260a depicted in FIG. 18A includes a bead 261 serving as a diffusion agent and a binder 262 for fixing the bead 261. The bonding of the bead 261 to the binder 262 can be accomplished by being coated on the upper side of a certain transparent substrate (not shown) or by being coated on the upper surface of the light path control film 241. In the latter, the light path control film 241, the bead 261, and the binder 262 are integrally formed. The light path control film 241 is used by selecting one of the light path control films depicted in FIGS. 15a to 15d. The material of the diffusion film 260a such as the bead 261 may have a refractive index identical to or different from that of the material of the light path control film 241, and the diffusion film 260a is made of a material of a refractive index for effective light diffusion.

A diffusion film 260b depicted in FIG. 18B includes a bead 264 having a size relatively larger than that of the bead 261 depicted in FIG. 18A and contained in a transparent substrate 263. The diffusion film 260b is formed on the upper side of the light path control film 241. Here, the light path control film 241 can be made in the form of any one of the light path control films depicted in FIGS. 15a to 15d.

A diffusion film 260c depicted in FIG. 18C includes two more beads 266 and 267 of different sizes added into the diffusion film 260a depicted in FIG. 18A. The diffusion film 260c is formed on the upper side of the light path control film 241, and the light path control film 241 can be made in the form of any one of the light path control films depicted in FIGS. 15A to 15D.

The beads 266 and 267 depicted in FIGS. 18A to 18C, can be manufactured from one of PMMA, vinyl chloride, acryl-based resin, polycarbonate, polyethylene terephthalate (PET), polyethylene (PE), polystyrene (PS), polypropylene (PP), polyimide-based resin (PI), glass, and silica may be used.

The liquid crystal display device according to the present invention has the following advantages. The light path control film has the minute patterns for refracting light, which is dispersed so as to prevent the gray inversion at the lower angles of the viewing angle, among the light being transmitted through the liquid crystal panel to the lower side of the liquid crystal panel and emitting the light in the front direction and in the upper angles of the viewing angle, so that the gray inversion is prevented and the deterioration of the optical characteristics at the front direction and the upper angles of the viewing angle can be also prevented. The gray inversion region is significantly reduced and a wide viewing angle is secured and the light from the lower angles of the viewing angle can redirect toward the upper angles of the viewing angle so that the luminous characteristics of the liquid crystal display can also be improved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
   a liquid crystal panel;
   a first polarizer disposed at an upper side of the liquid crystal panel;
   a second polarizer disposed at a lower side of the liquid crystal panel; and
   a light path control film disposed at an outer side of the first polarizer and configured to redirect light transmitted through the liquid crystal panel at low angles of a viewing angle to minimize gray inversion at the low angles of the viewing angle,
   wherein the light path control film emits the light in two or more different directions of a lower viewing angle and in the front direction simultaneously,
   wherein the light path control film comprises a transparent substrate comprising:
      a plurality of triangular protruded patterns on an emitted surface of the light configured to emit the light in two or more different directions of the lower viewing angle, and
      a recessed flat surface formed among the triangular protruded patterns configured to emit the light in the front direction,
   wherein the triangular protruded patterns include at least two or more shapes,
   wherein each triangular pattern comprises an asymmetric prism,
   wherein the different shaped prisms redirect the light toward the two or more directions of the lower viewing angle different from each other, according to the inclination of each different shaped prism, and
   wherein light from the recessed flat surface formed among the prisms emits in a same direction as incident light.

2. The liquid crystal display device as set forth in claim 1, wherein the transparent substrate comprises at least one of: polymethylmethacrylate, vinyl chloride, acryl-based resin, polycarbonate, polyethylene terephthalate, polyethylene, polystyrene, polypropylene, polyimide-based resin, glass, and silica.

3. The liquid crystal display device as set forth in claim 2, wherein the refractive index of the light path control film is adjusted by combination of at least one of: polymethylmethacrylate, vinyl chloride, acryl-based resin, polycarbonate, polyethylene terephthalate, polyethylene, polystyrene, polypropylene, polyimide-based resin, glass, and silica.

4. The liquid crystal display device as set forth in claim 1, wherein the light path control film further comprises a transparent substrate.

5. The liquid crystal display device as set forth in claim 1, wherein the light path control film is further configured to redirect a portion of light at lower angles of the viewing angle toward upper angles of the viewing angle.

6. The liquid crystal display device as set forth in claim 5, wherein the light path control film is further configured to redirect the light from a front direction simultaneously to lower angles of the viewing angle and to upper angles of the viewing angle.

7. The liquid crystal display device as set forth in claim 6, wherein the light path control film is further configured to emit a quantity of the light emitted in the front direction greater than a quantity of the light emitted in the lower angles of the viewing angle or upper angles of the viewing angle.

8. The liquid crystal display device as set forth in claim 1, wherein the light path control film is further configured to emit a first quantity of the light emitted in the front direction that is greater than a second quantity of light emitted in the lower angles of the viewing angle.

9. The liquid crystal display device as set forth in claim 1, further comprising a diffusion film disposed at the upper side of the light path control film and configured to disperse the redirected light.

10. The liquid crystal display device as set forth in claim 9, wherein the diffusion film includes diffusion particles, configured to disperse light, coated on the transparent substrate.

11. The liquid crystal display device as set forth in claim 10, wherein the diffusion film further comprises diffusion particles contained in the transparent substrates.

12. The liquid crystal display device as set forth in claim 10, wherein the diffusion particles include beads of a predetermined size.

13. The liquid crystal display device as set forth in claim 10, wherein:
the diffusion particles include a plurality of several sized beads, and
some of the beads have a refractive index identical to that of the light path control film.

14. The liquid crystal display device as set forth in claim 13, wherein the beads comprise at least one of: polymethylmethacrylate, vinyl chloride, acryl-based resin, polycarbonate, polyethylene terephthalate, polyethylene, polystyrene, polypropylene, polyimide-based resin, glass, and silica.

15. The liquid crystal display device as set forth in claim 1, wherein the liquid crystal panel comprises:
a first substrate and a second substrate facing each other;
a plurality of gate lines and a plurality of data lines crossing each other on the first substrate to define pixel regions;
a pixel electrode formed in the pixel region on the first substrate;
a common electrode formed on the second substrate; and
a liquid crystal layer filled between the first substrate and the second substrate.

* * * * *